Figure 1:
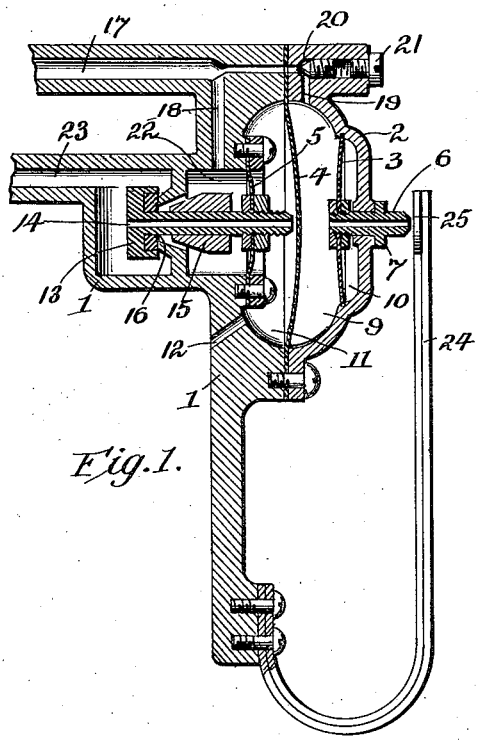

C. F. JOHNSON.
AUTOMATIC CONTROL DEVICE.
APPLICATION FILED JUNE 1, 1914.

1,162,170.

Patented Nov. 30, 1915.

Witnesses:

Inventor:
Carl F. Johnson,
By Dodge & Sons
Attorneys.

UNITED STATES PATENT OFFICE.

CARL F. JOHNSON, OF MILWAUKEE, WISCONSIN, ASSIGNOR TO JOHNSON SERVICE COMPANY, OF MILWAUKEE, WISCONSIN, A CORPORATION OF WISCONSIN.

AUTOMATIC CONTROL DEVICE.

1,162,170. Specification of Letters Patent. Patented Nov. 30, 1915.

Continuation of application Serial No. 723,899, filed October 4, 1912. This application filed June 1, 1914. Serial No. 842,225.

*To all whom it may concern:*

Be it known that I, CARL F. JOHNSON, a citizen of the United States, residing at Milwaukee, in the county of Milwaukee and State of Wisconsin, have invented certain new and useful Improvements in Automatic Control Devices, of which the following is a specification.

This application is filed as a continuation of and substitute for my application Serial Number 723,899, filed October 4, 1912 and heretofore allowed. The present application contains the entire subject-matter of the allowed application and in addition a specific disclosure of the applicability of the invention to automatic control devices generally, the prior application being possibly restricted to thermostats by tacit limitations in its claims. As stated in the supplemental oath filed with this application the entire subject-matter of the present application was in fact a part of the original invention.

The present invention relates to thermostats, hygrostats and kindred automatic control devices, and is particularly intended for use in systems for controlling temperature or humidity, such as the Johnson system. In this system as commonly constructed for temperature regulation the thermostatic device consists of a bimetallic thermostatic bar which moves under the influence of temperature changes to open and close a leak port. Through this leak port fluid under pressure, usually compressed air, escapes at a restricted rate. When the leak port is open the leakage of air through the port is sufficient to cause a control valve operating motor to remain inert, but when the leak port is closed this motor is moved to shift the control valve mechanism. The operation of this control valve mechanism usually admits or exhausts air to and from a secondary motor which is directly connected to dampers or any other mechanisms which are to be controlled in response to temperature variations. All such prior structures have required as an element thereof, a quick throw device between the motor and the control valve to move the control valve suddenly from full open to full closed position, and this has resulted in considerable complication. The same is true of the devices for controlling humidity, the essential distinction being the use of a different responsive element and the control of a different type of mechanism by the device.

The purpose of the present invention is to avoid the use of such quick throw mechanism and to secure a thermostat, hygrostat or the like, which is simpler in construction and quicker in action than any heretofore known.

Figure 4:
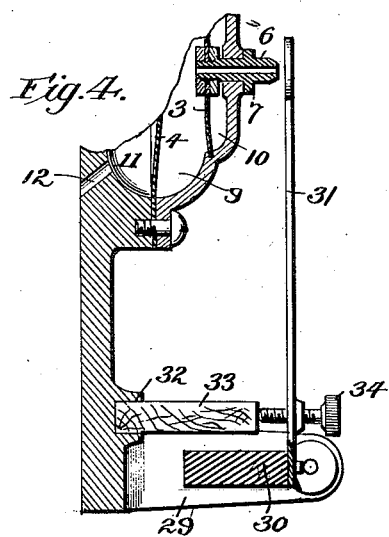
Figure 2:
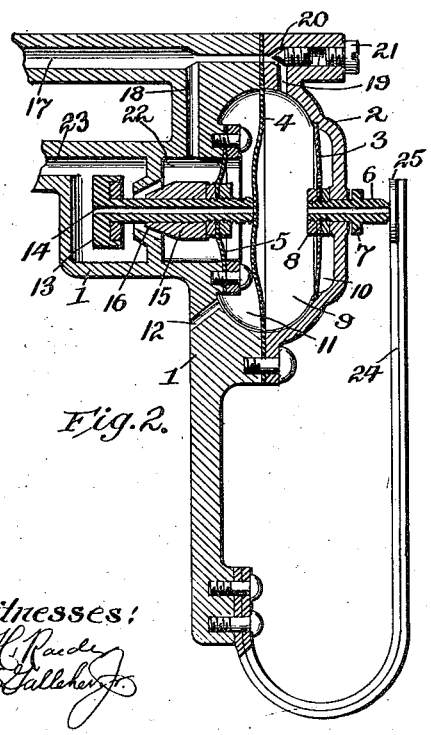
Figure 3:
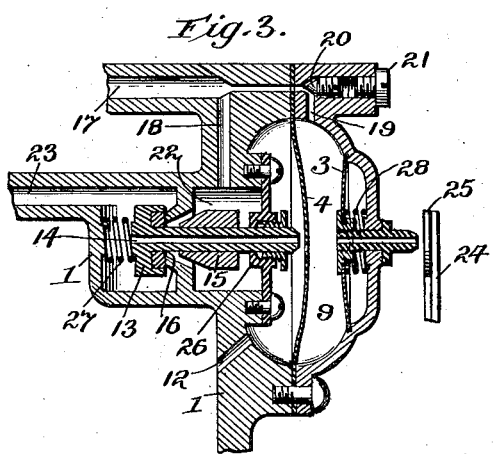

I shall describe the invention as embodied in a thermostat intended for use in the Johnson system, though capable of use in other systems in its present or in slightly modified forms. As a modified construction I shall show the invention as applied to a hygrostat. The characteristic of the device is the use of a shifting leak port by which I secure a sufficiently quick opening and closing action of the leak valve to avoid the necessity of the quick throw mechanism hitherto considered essential. The principal mechanical features of such a device are illustrated in the accompanying drawings, in which, Figure 1 is a vertical section through the thermostatic valve showing the position assumed by the parts when the leak port is open; Fig. 2 is a view similar to Fig. 1, showing the position the parts assume when the leak port is closed; Fig. 3 is a similar view of a modified structure, showing the leak port open; and Fig. 4 is a similar view of a hygrostat embodying my invention.

In the drawings, 1 represents the wall plate or frame of the thermostatic device and 2 is the front or cover plate thereof, the castings 1 and 2 forming a hollow body which is divided into various chambers by means of three diaphragms 3, 4, and 5. The diaphragm 3 carries fast thereto the leak tube or vent valve member 6, which is mounted for longitudinal movement through the front plate 2, such movement being limited by a shoulder 7 and the clamping nuts 8 which clamp the tube 6 to the diaphragm. Usually a range of movement of one or two one-thousandths of an inch is sufficient. In the device shown in Figs. 1 and 2 the diaphragm 3 is made of thin resilient metal and is designed to urge the leak tube 6 inward but to allow it to move outward under moderate pressure in the chamber 9 to the left of the diaphragm 3. The chamber 10 to the right of the diaphragm 3 is open to the atmosphere around the leak tube 6, so that the pressure in the chamber 10 is practically constant and has no function in the operation of the device. The chamber 9 is divided from a chamber 11 by the diaphragm 4 which is relatively flexible and may be made of any suitable material such as leather or rubber fabric. The chamber 11 is open to the atmosphere through an exhaust port 12 and may be termed the exhaust chamber of the device. Upon a rise of pressure in the chamber 9 the diaphragm 4 would be forced to the left and would bear against the end of the stem of a valve member 13. This valve member 13 is formed with a longitudinal exhaust port 14, and is guided in a slide-way 15. The valve member 13 is clamped to diaphragm 5, as shown, and when in its right-hand position as viewed in the drawing, it seals a supply port 16, formed in the casting 1.

Air is constantly supplied under pressure through a supply port 17 which has two branches 18 and 19. The branch 19 is provided with a needle valve 20 to adjust the rate of flow, the needle valve 20 being sealed against leakage by means of a screw plug 21, as shown. The branch 19 leads to the chamber 9 which is vented to the atmosphere through the leakage tube 6 when the device is in the position shown in Fig. 1. The branch 18 leads to the space 22 at the left of diaphragm 5 and at the right of the supply port 16, which opens into the control pipe 23 connected to the motor to be operated. This commonly is the damper motor used in various regulating systems.

The parts are so arranged that when the diaphragm 4 moves to the left it first seals the exhaust port 14 and then moves the valve member 13 bodily to the left, opening supply port 16. Pressure acting against the left side of diaphragm 5 constantly urges it to the right and when the pressure in chamber 9 to the right of diaphragm 4 falls, valve 13 will be allowed to move to the right and seal the port 16, after which the air will be vented from the pipe 23 through the port 14, chamber 11 and port 12. The valve 13 with its co-acting parts forms merely a supply and exhaust valve adapted to admit pressure to and release it from a secondary motor connected to the pipe 23. I contemplate the substitution for this valve of any suitable mechanism operable by the diaphragm 4 or similar primary motor and adapted properly to control the operation of a secondary motor.

24 is a bi-metallic thermostatic bar characteristic of the Johnson thermostats, the bar bending under changes of temperature to open and close the leakage tube 6, by means of a valve face 25, carried on the end of the bar 24. Other thermosatic devices, well known in the art, may be substituted for the thermostatic bar. Means may be provided for adjusting the position of the thermostatic bar in any of the ways familiar in the art.

When the device is in the position shown in Fig. 1 it will be noted that the valve face 25 is held away from the leak tube 6 by the bi-metallic bar 24. The needle valve is so adjusted as to restrict the flow therethrough to a point less than the capacity of the leak tube 6, so that the leak tube 6 may effectually vent the chamber 9 and prevent any accumulation of pressure therein while the leak tube is open. Consequently diaphragm 4 stands to the right and permits a closing of supply port 16 and a venting of pressure from pipe 23 and its connected motor, as already explained. It is to be observed that the resilient diaphragm 3 maintains the leak tube 6 in its inner or left hand position when the parts are in the position described. If now, through a change of temperature the bar 24 moves valve face 25 toward leak tube 6, and even before it has completely sealed the leak tube 6, the following action takes place: The retardation of flow through the leak tube will cause a rise of pressure in chamber 9 which, acting upon diaphragm 3, will force the same to the right thus tightly sealing the leak tube against valve face 25. Immediately this sealing has taken place pressure will rapidly rise in chamber 9, forcing diaphragm 4 to the left so as to seal the port 14 and move valve 13 to open port 16. Air will thereupon flow through pipe 17, chamber 22 and port 16 to the pipe 23 so as to operate the damper motor or other equivalent device. Upon a subsequent change of temperature in the opposite direction a very slight movement of valve face 25 away from leak tube 6 will initiate a venting of chamber 9 sufficient to cause diaphragm 3 to move the leak tube 6 to the left. Such movement causes a rapid discharge from the chamber 9 and a rapid movement of diaphragm 4 to the right which as will be apparent closes supply port 17 and opens exhaust port 14, allowing the damper motor to move in the reverse direction.

In the construction above set forth I have relied upon pressure on diaphragm 5 to move the valve 13 to the right and upon the resiliency of diaphragm 3 to move leak tube 6 to the left.

In Fig. 3 I have shown a modified device in which the valve 13 moves through a stuffing box 26 instead of being attached to a diaphragm 5, the spring 27 being added to force the valve to the right. I also illustrate in this figure a non-metallic flexible diaphragm 3 with which I use a spring 28 to urge the leak tube 6 to the left.

In Fig. 4 I illustrate the application of the invention to a hygrostat. The only change is the substitution of a hygrostatic element for the thermostatic bar. The other working parts are the same as previously described, and are indicated by the same reference numerals. At the lower end of the frame 1 a pair of forwardly projecting lugs 29 are provided. To these is pivoted a weighted saddle 30 which carries an upstanding valve bar 31 to coact with the leak tube 6. The saddle 30 is so weighted as to swing the valve bar 31 in a direction to seal against the tube 6. Mounted in a socket 32 in the frame 1 is an outwardly projecting hygrostatic element 33, which may consist of wood cut across the grain or any other material which will change its length with changes of atmospheric humidity. An adjusting screw 34 threaded in the valve bar 31 bears against the end of the hygrostatic element 33, the screw 34 permitting the desired adjustment of the valve bar 31 with reference to the leak tube 6. Changes of atmospheric humidity will move the valve bar 31 to control the leak tube 6 and cause the actuation of the device in the manner already described.

From the above description it will be apparent that the prime distinction between my device and the prior art is that I provide a quick acting vent valve which moves so promptly from full open to full closed position as to obviate the necessity of a quick throw device between the control diaphragm or primary motor and the control mechanism. This not only avoids the complication incident to such a quick throw device, but provides a valve which is much more sensitive than those heretofore constructed and which has no neutral position. The essential invention, therefore, resides in the quick acting thermostatic vent valve in combination with a primary pressure motor, such as the diaphragm 4. This primary motor may, as shown, actuate a control valve to regulate the operation of a secondary fluid pressure motor, or it may actuate any other type of control mechanism adapted to control the operation of any other corresponding type of secondary motor, such devices being known equivalents in the art. In fact the primary motor may be used to operate a wide range of devices, and I contemplate such use. It is also to be noted that the vent valve might take different forms which will readily suggest themselves, the essential feature being that the valve consists of co-acting elements, one of which is movable by a thermostatic, hygrostatic or other responsive element affected by changes of atmospheric condition, and the other of which is moved in a closing direction by an initial increase of pressure in the chamber 9, and in an opening direction by an initial decrease of pressure in said chamber. Consequently I do not limit myself to the specific device shown but contemplate the substitution of well known equivalents where they secure the same effect and lie within the scope of my inventive idea.

I use the term "abutment" in the claims to include such devices as pistons, diaphragms, etc., all of which are known equivalents in the art.

I use the term "responsive element" in the claims to include thermostatic, hygrostatic or other elements which are subject to a change of form in response to changes in atmospheric conditions.

Having thus described my invention, what I claim is:—

1. The combination of a fluid pressure motor; a source of fluid pressure leading thereto; a vent valve for said motor adapted to be moved by pressure in said motor; and a closure for said valve located in line therewith having automatic actuating means responding to changes in atmospheric condition, said valve being adapted to move toward said closure upon a rise of pressure in said motor, whereby a quick sealing is effected.

2. The combination of a fluid pressure motor; a source of fluid pressure leading thereto; a vent valve for said motor adapted to move under variations of pressure in said motor; and a closure for said valve located in line therewith having automatic actuating means responding to changes in atmospheric condition, said valve being adapted to move away from said closure upon a fall of pressure in said motor whereby a quick venting is secured.

3. The combination of a control mechanism for a motor; a fluid pressure actuated abutment adapted to operate said control mechanism; a source of fluid pressure leading thereto; a vent valve mechanism responsive to changes in atmospheric condition adapted to vent fluid pressure acting on said abutment; and a pressure actuated device subject to the fluid pressure acting on said abutment and adapted to coact with the vent valve mechanism to close the same upon an initial increase of fluid pressure and to open the same upon an initial decrease of pressure.

4. The combination of a control mechanism for a motor; a fluid actuated abutment adapted to operate said control mechanism; a source of fluid pressure leading thereto; a vent valve mechanism responsive to changes in atmospheric condition adapted to vent fluid pressure acting on said abutment; and a resilient diaphragm subject to the fluid pressure acting on said abutment and adapted upon an initial increase of such pressure to close said vent valve, and upon an initial decrease in said pressure to open said vent valve.

5. The combination of a control mechanism adapted to control the operation of a motor; a fluid pressure actuated abutment adapted to operate said control mechanism; a source of fluid pressure leading thereto; a movable valve member having a port adapted to vent pressure from said abutment; a second movable valve member adapted to coact with the first movable valve member to control the vent port therein; a responsive element operatively connected to move one valve member in response to variations in atmospheric condition; and a pressure actuated device subject to the pressure acting on said abutment and adapted to coact with the other valve member to move the same in a closing direction upon an initial increase in such pressure and in an opening direction upon an initial decrease in such pressure.

6. The combination of a control mechanism adapted to control the operation of a motor; a fluid pressure actuated abutment adapted to operate said control mechanism; a source of fluid pressure leading thereto; a movable valve member having a port adapted to vent pressure from said abutment; a second movable valve member adapted to coact with the first movable valve member to control the vent port therein; a responsive element operatively connected to move one valve member in response to variations in atmospheric condition; and a resilient diaphragm subject to the pressure acting on said abutment and adapted to coact with the other valve member to move the same in a closing direction upon an initial increase in such pressure and in an opening direction upon an initial decrease therein.

7. The combination with a control mechanism including a pressure chamber and a source of fluid pressure leading thereto; of a valve member having a sealing face; a responsive element adapted to move said valve member; a vent tube adapted to vent pressure from said chamber and mounted to have a limited movement toward and from said sealing face to close and open said tube; an abutment subject to pressure in said chamber and connected to said vent tube to move the same toward said sealing face; and resilient means opposing such movement.

8. The combination with a control mechanism including a pressure chamber and a source of fluid pressure leading thereto; of a valve member having a sealing face; a responsive element adapted to move said valve member; a vent tube adapted to vent pressure from said chamber and mounted to have a limited movement toward and from said sealing face to close and open said tube; and a resilient diaphragm connected to said tube subject to the pressure in said chamber and adapted to urge said tube toward said sealing face in opposition to the resiliency of said diaphragm.

9. The combination with a control mechanism including a pressure chamber and a source of fluid pressure leading thereto; a movable valve having a sealing face; a responsive element adapted to move said valve; a vent tube adapted to vent pressure from said chamber and mounted to have a limited movement toward and from said sealing face; and a mechanism subject to pressure in said chamber, connected to said vent tube and adapted to move the latter into sealing engagement with said sealing face upon an initial rise of pressure in said chamber, and out of such engagement upon an initial fall of such pressure.

10. A vent valve for a pressure motor control device comprising a vent tube mounted to have limited longitudinal movement; a responsive element having a sealing face movable under changes of atmospheric condition into and out of sealing relation with the end of said tube; an abutment connected to said tube and subject to the pressure to be vented, urging said tube toward said sealing face; and resilient means acting in opposition to the pressure on said abutment.

11. A vent valve for a pressure motor control device comprising a vent tube mounted to have limited longitudinal movement; a responsive element having a sealing face movable under changes of atmospheric condition into and out of sealing relation with the end of said tube; and a resilient diaphragm connected to said tube and subject to the pressure to be vented, acting to move said tube toward said sealing face in opposition to the resiliency of the diaphragm.

12. A vent valve for a pressure motor control device comprising a valve member having a vent port; a second valve member coacting with the first to control said vent port; a responsive element adapted to move one valve member in response to variations in atmospheric condition; and a pressure actuated device subject to the pressure to be vented and adapted upon a rise of such pressure to move the other valve member toward closed position and upon a fall of such pressure toward open position.

13. In a control device a valve adapted alternately to supply and exhaust fluid pressure to a secondary device; means urging said valve toward exhaust position; a valve actuating motor adapted under pressure to force said valve from exhaust to supply position; a responsive element having a sealing face adapted to move in accordance with variations of atmospheric condition; a vent tube adapted to vent pressure from said motor and to move into and out of sealing relation with said sealing face; and a pressure actuated device, subject to the pressure in said motor, connected to said vent tube and adapted to move the latter toward said sealing face upon an increase of such pressure and away from said sealing face upon a decrease of such pressure.

14. In a control device a valve adapted alternately to supply and exhaust fluid pressure to a secondary device; means urging said valve toward exhaust position; a valve actuating motor adapted under pressure to force said valve from exhaust to supply position; a responsive element having a sealing face adapted to move in accordance with variations of atmospheric condition; a vent tube adapted to vent pressure from said motor and to move into and out of sealing relation with said sealing face; and a resilient diaphragm, subject to the pressure in said motor, connected to said vent tube and adapted to move the latter toward said sealing face upon an increase of such pressure and away from said sealing face upon a decrease of such pressure.

15. A vent valve for a fluid pressure control device including a member having a vent port; a valve member co-acting therewith to control said port; a responsive element adapted to move said valve member in response to variations in atmospheric condition; and a pressure actuated device subject to the pressure to be vented, and adapted upon a rise of such pressure to effect a closing of the vent port by relative movement of the valve member and the port.

In testimony whereof I have signed my name to this specification in the presence of two subscribing witnesses.

CARL F. JOHNSON.

Witnesses:
 EDWIN L. JAUKE,
 GEORGE BRUESER.